T. WHITE.
GATE VALVE.
APPLICATION FILED AUG. 30, 1909. RENEWED NOV. 5, 1912.
1,159,453.
Patented Nov. 9, 1915.
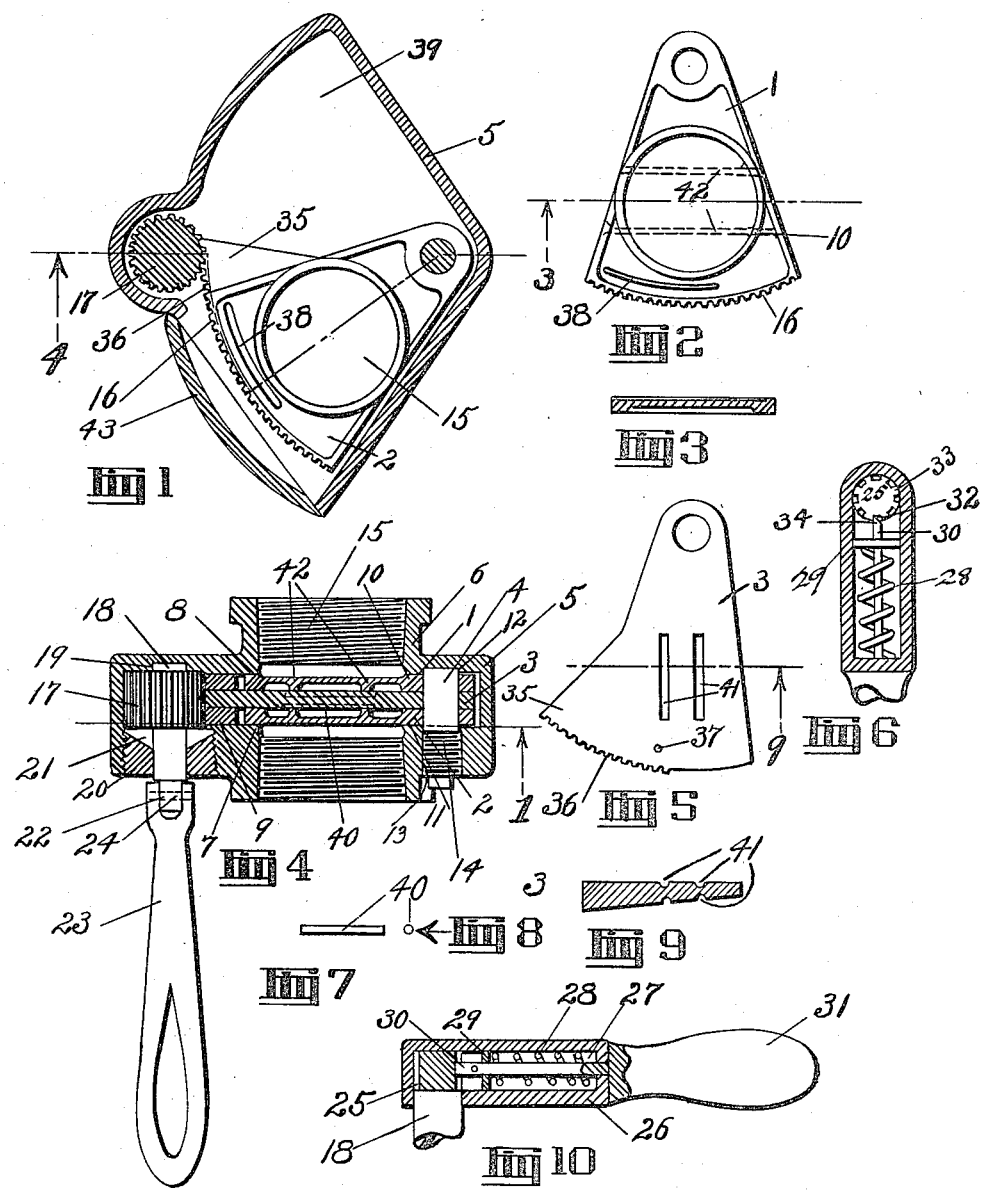
WITNESSES
S. Allbin.
Evelyn L. Miller
INVENTOR.
TILMAN WHITE
BY
HIS ATTORNEY

UNITED STATES PATENT OFFICE.

TILMAN WHITE, OF PORTLAND, OREGON, ASSIGNOR, BY DIRECT AND MESNE ASSIGNMENTS, TO DAVE HIRSTEL, OF OAKLAND, CALIFORNIA.

GATE-VALVE.

1,159,453.      Specification of Letters Patent.      Patented Nov. 9, 1915.

Application filed August 30, 1909, Serial No. 515,330. Renewed November 5, 1912. Serial No. 729,656.

*To all whom it may concern:*

Be it known that I, TILMAN WHITE, a citizen of the United States, residing in the city of Portland, in the county of Multnomah and State of Oregon, have invented a new and useful Gate-Valve, of which the following is a clear and concise specification.

My invention relates to gate valves in which the valves are pressed against their seats after they come to rest in alinement with the valve seats, and in which the pressure against the seats is released before the valves are moved out of alinement with the seats.

The object of my invention is to provide a gate valve in which the valve disk is moved laterally against the valve seat after the longitudinal motion of the disk toward alinement with the seat has ceased.

Another object of the invention is to provide a gate valve in which the valve disk is moved laterally away from the valve seat before the longitudinal motion of the disk from alinement with the valve seat commences.

A further object of the invention is to provide a gate valve in which the movable parts of the valve may be examined while the valve is under pressure.

A further object of the invention is to provide an efficient gate valve which is easily operable under high pressure.

The invention possesses other advantageous features, which, with the foregoing, will be set forth at length in the following description where I shall outline in full that form of the invention which I have selected for illustration in the drawings accompanying and forming part of the present specification.

The novelty of the invention will be included in the claims succeeding said description.

From this it will be apparent that I do not limit myself to the showing made by said drawings and description, since I may adopt many variations within the scope of my invention as expressed in said claims. Referring to said drawings:

Figure 1 is a section on the line 1, Fig. 4 of my device; Fig. 2 is an elevation of one of the valves in my device; Fig. 3 is a section on the line 3, Fig. 2; Fig. 4 is a section on the line 4, Fig. 1; Fig. 5 is an elevation of the adjusting wedge of my device; Fig. 6 is a section through the center of the ratchet of my device; Figs. 7 and 8 are details of one of the anti friction rolls of my device; Fig. 9 is a section on the line 9, Fig. 5 of my device and Fig. 10 is a section of the ratchet adjusting lever taken at 90 degrees from the section taken in Fig. 6.

Similar reference numerals refer to similar parts hereinafter set forth and illustrated in the accompanying drawings.

The valves 1 and 2 as well as the wedge 3 between said valves 1 and 2 are preferably provided with a common pivotal connection 4 which swingingly mounts said vavles 1 and 2 and the wedge 3 in the housing 5 which is preferably provided with the extensions 6 and 7 which may be threaded or flanged for the purpose of connecting pipe to deliver and discharge water through my device. The inner surface of the housing 5 is preferably machined to form annular valve bearing seats 8 and 9 which register with the seats 10 and 11 of the valves 1 and 2. The pivotal connection 4 is advantageously extended into the depression 12 which holds said pivotal connection in fixed relation to said housing 5 at one end, the opposite end thereof being of the same diameter as the machined hole 13 which is preferably provided with a plug 14 which when removed permits the removal of the pivotal connection 4 and when in place prevents leakage through the machined hole 13.

Thus it will be seen that the pin 4 is held from longitudinal movement by said plug 14. I do not wish to be limited to this construction however as it may be desired to form said plug 14 and said pin 4 integrally, thus affording a greater bearing in said housing for said pin.

The housing 5 is preferably cast in one piece and is provided with a hollow center permitting the valves 1 and 2 as well as the adjusting wedge 3 to swing sufficiently to entirely close the pipe opening 15 and when said valves 1 and 2 and the adjusting wedge 3 are raised said housing is of sufficient proportions to permit a free flow of water through said opening 15.

Each of the valves 1 and 2 are provided with a segmental rack 16 which engages a pinion or gears 17 which is rotatably mounted in said housing 5 by means of the arbor 18 journaled in the recess 19 at one end and in the packing gland 20 at its opposite end which is preferably adapted to force packing in the packing space 21 against the end of said gland 20 as well as the arbor 18 and also against the end surface of the pinion 17 preventing leakage from the interior of the housing to the atmosphere. The arbor 18 is extended through the packing gland 20 and flattened on the end 22 to receive the handle 23 which is swingingly secured thereto by the pin 24. This construction however, may be modified as shown in Figs. 6 and 10 by providing a ratchet 25 in the place of the flattened end of said arbor 18. The handle 26 being swingingly mounted on said arbor 18 is provided with a hollow center 27 which is adapted to receive the spring 28 acting against the collar 29 which is secured to the pawl 30 which is slidably mounted in said hollow center 27 and is secured to the handle 31. Said pawl 30 is provided with an end inclined surface 32 engaging the teeth 33 of said ratchet 25 to lift said pawl out of engagement. The teeth 33 are preferably provided with surfaces radially disposed affording a means for engaging the straight surface 34 of the pawl 30 thus when said pawl is turned 180 degrees by turning the handle 31 the direction of travel of said arbor 18 may be reversed.

By this construction it will be seen that the valves 1 and 2 and the adjusting wedge 3 may be raised and lowered. The adjusting wedge 3 is preferably provided with an extension 35 which forms a portion of the segmental rack 36 which as well as the segmental racks 16 engage and mesh with the teeth of the pinion or gear 17. When the valves 1 and 2 are lowered to the closed position the racks 16 disengage the pinion 17, however the rack 35 still engages said pinion 17 which forces the wedge 3 downwardly spreading said valves 1 and 2 and crowding said valves against their respective seats. The wedge 3 is provided with a pin 37 which engages slots 38 provided in each of said valves 1 and 2, thus when said wedge 3 is raised said pin will engage the upper end of said slots 38 raising each of said valves 1 and 2 until said racks 16 engage and mesh with the pinion 17; said wedge 3 and each of said valves 1 and 2 will continue rising until the rack 36 of said wedge 3 ceases to mesh with said pinion 17 permitting the valves 1 and 2 to travel to their upper position. The wedge is stopped in its upward path of travel before the valves 1 and 2 have reached their extreme travel to overcome the necessity of providing additional space in the portion 39 of said housing 5.

I have provided antifriction rolls 40 which are held and travel in the recesses 41 provided in said wedge 3 and engage the vertical extending bars 42 on the back of each of said valves 1 and 2.

I have provided a cap 43 adjacent said racks 16 and 36 while the valves 1 and 2 and the wedge 3 are in their lowered position said cap 43 being removably secured to the housing 5 for permitting inspection of said valves 1 and 2 and wedge 3, as well as the pinion 17 and said seats 8 and 9, when my valve is under pressure. Said cap 43 also permits the removal of said valves 1 and 2 and wedge 3.

I do not wish to be limited to the specific details herein set forth and illustrated in the accompanying drawings but wish to depart therefrom within the scope of the appended claims.

Having thus described my invention what I claim as new and desire to secure by Letters Patent is:

1. In a gate valve, a housing, valve seats provided in said housing and valves pivotally connected to said housing and resting against said valve seats when the gate valve is closed, an adjusting wedge adapted to urge said valves against their respective seats and a rack and gear whereby the valves and adjusting wedge are operated to open and close the valve.

2. In a gate valve, swingingly mounted valves and a swingingly mounted wedge therebetween, a housing provided with valve seats engaging said valves, a gear rotatably mounted within said housing and operated from the exterior thereof and meshing with said valves and said wedge to open and close said gate valve.

3. In a gate valve, a housing, a gear rotatably mounted within said housing, swingingly mounted valves having segmental racks engaging said gear whereby said valves are raised and lowered to open and close the gate valve and means whereby said segmental racks disengage said gear when said valves are at their lower termination of travel.

4. In a gate valve, a housing, a gear rotatably mounted within said housing, swingingly mounted valves having segmental racks engaging said gear whereby said valves are raised and lowered to open and close the gate valve, means whereby said segmental racks disengage said gear when said valves are at their lower termination of travel and an adjusting wedge pivotally connected to said housing, a rack provided on said adjusting wedge and means whereby said rack is kept in engagement with said gear when at the lower termination of travel to urge said valves against their respective seats.

5. In a gate valve, a housing, a gear rotatably mounted within said housing, swingingly mounted valves having segmental racks engaging said gear whereby said valves are raised and lowered to open and close the gate valve, means whereby said segmental racks disengage said gear when said valves are at their lower termination of travel, an adjusting wedge pivotally connected to said housing, a rack provided on said adjusting wedge, means whereby said rack is kept in engagement with said gear when at the lower termination of travel to urge said valves against their respective seats and a pin provided on said wedge engaging slots in said valves to raise said valves to bring the rack thereon into engagement with the teeth of said gear permitting the raising of the valves and adjusting wedge.

6. In a gate valve, a housing, a gear rotatably mounted within said housing, swingingly mounted valves having segmental racks engaging said gear whereby said valves are raised and lowered to open and close the gate valve, means whereby said segmental racks disengage said gear when said valves are at their lower termination of travel, an adjusting wedge pivotally connected to said housing, a rack provided on said adjusting wedge, means whereby said rack is kept in engagement with said gear when at the lower termination of travel to urge said valves against their respective seats, a pin provided on said wedge engaging slots in said valves to raise said valves to bring the rack thereon into engagement with the teeth of said gear permitting the raising of the valves and adjusting wedge and a means whereby said rack on the adjusting wedge may disengage said gear at its upper termination of travel.

7. In a gate valve, swingingly mounted valves, a wedge disposed between said valves, segmental racks provided on said valves and on said wedge, a gear engaging said segmental racks and a handle adapted to revolve said gear in either direction to raise and lower said wedge and said valves.

8. In a gate valve, a housing, valve seats provided in said housing, valves within said housing adapted to be moved into alinement with said seats, an adjusting wedge arranged between said valves, racks on said valves and wedge, and a gear adapted to engage said racks.

9. In a gate valve, a housing, a valve seat in said housing, a valve pivotally connected to said housing adapted to be moved into alinement with said seat, a wedge adapted to urge said valve against said seat, racks on said valve and wedge, and a gear adapted to engage said racks.

10. In a gate valve, a housing, a valve seat provided in said housing, a swingingly mounted valve, and a swingingly mounted wedge arranged in said housing, a gear rotatably mounted within said housing, and operable from the exterior thereof, and racks on said valve and wedge engaging said gear.

11. In a gate valve, a housing, valve seats provided in said housing, valves within said housing adapted to be moved into alinement with said seats, a swingingly mounted adjusting wedge arranged between said valves and connected thereto, a rack on said wedge and a gear engaging said rack.

In testimony whereof I have signed my name to this specification in the presence of two subscribing witnesses.

TILMAN WHITE.

Witnesses:
O. L. BLANCHARD,
S. ALLBIN.

Copies of this patent may be obtained for five cents each, by addressing the "Commissioner of Patents, Washington, D. C."